United States Patent
Makarow et al.

(10) Patent No.: US 10,502,124 B2
(45) Date of Patent: Dec. 10, 2019

(54) EXHAUST GAS TURBOCHARGER COMPRISING ADJUSTING DEVICE

(71) Applicant: Mahle International GmbH, Stuttgart (DE)

(72) Inventors: Eugen Makarow, Ludwigsburg (DE); Edgar Salfeld, Lichtenwald (DE); Florian Wetzel, Baltmannsweiler (DE)

(73) Assignee: Mahle International GmbH (DE)

( * ) Notice: Subject to any disclaimer, the term of this patent is extended or adjusted under 35 U.S.C. 154(b) by 148 days.

(21) Appl. No.: 15/873,503

(22) Filed: Jan. 17, 2018

(65) Prior Publication Data

US 2018/0202351 A1 Jul. 19, 2018

(30) Foreign Application Priority Data

Jan. 18, 2017 (DE) .......................... 10 2017 200 771

(51) Int. Cl.
*F02B 37/18* (2006.01)
*F02B 39/00* (2006.01)
(Continued)

(52) U.S. Cl.
CPC .......... *F02B 37/186* (2013.01); *F01D 17/105* (2013.01); *F01D 25/24* (2013.01);
(Continued)

(58) Field of Classification Search
CPC ... H02K 5/04; H02K 5/20; H02K 5/26; Y02T 10/144; F02B 37/186
See application file for complete search history.

(56) References Cited

U.S. PATENT DOCUMENTS 2,623,186 A * 12/1952 Wilde .................... F02B 65/00
310/89
8,424,186 B2 4/2013 Kern et al.
(Continued)

FOREIGN PATENT DOCUMENTS

DE 10006913 A1 8/2001
DE 202004012820 U1 10/2004
(Continued)

OTHER PUBLICATIONS

English abstract for DE-102009045339.
(Continued)

*Primary Examiner* — Laert Dounis
(74) *Attorney, Agent, or Firm* — Fishman Stewart PLLC (57) ABSTRACT

An adjusting device for mechanically actuating a component may include a housing, which may include a first housing part and a second housing part that abut on one another along a dividing plane. The device may also include an electric motor for rotationally driving an actuator arranged on the second housing part and configured to couple to a component. The first housing part and the second housing part may be fastenable to one another via a plurality of first fastening elements disposed on the first housing part and a plurality of second fastening elements provided complementary thereto and disposed on the second housing part. The plurality of first fastening elements and the plurality of second fastening elements may be arranged evenly distributed in the circumferential direction such that the first housing part and the second housing part are fastenable in a plurality of different rotational positions.

20 Claims, 6 Drawing Sheets

(51) Int. Cl.
*F02B 33/40* (2006.01)
*H02K 5/20* (2006.01)
*H02K 5/26* (2006.01)
*H02K 5/04* (2006.01)
*F01D 17/10* (2006.01)
*F01D 25/24* (2006.01)

(52) U.S. Cl.
CPC ............ *F02B 33/40* (2013.01); *F02B 39/005* (2013.01); *H02K 5/04* (2013.01); *H02K 5/20* (2013.01); *H02K 5/26* (2013.01); *F05D 2220/40* (2013.01); *F05D 2250/90* (2013.01); *Y02T 10/144* (2013.01)

(56) References Cited

U.S. PATENT DOCUMENTS

| | | | |
|---|---|---|---|
| 2002/0141084 A1 | 10/2002 | Bohm | |
| 2008/0036309 A1* | 2/2008 | Toyama | H02K 26/00 310/36 |
| 2013/0340426 A1 | 12/2013 | Bogner et al. | |
| 2015/0244241 A1 | 8/2015 | Leroux | |
| 2016/0258349 A1 | 9/2016 | Bonanno | |
| 2017/0082017 A1 | 3/2017 | Nowak et al. | |
| 2018/0016932 A1* | 1/2018 | Makarow | F01D 7/00 |

FOREIGN PATENT DOCUMENTS

| | | | | |
|---|---|---|---|---|
| DE | 102008040873 A1 | | 2/2010 | |
| DE | 202008013947 U1 | | 3/2010 | |
| DE | 102009045339 A1 | | 4/2011 | |
| DE | 102012100054 A1 | | 7/2013 | |
| DE | 102013220740 A1 | | 4/2015 | |
| DE | 102014106517 A1 | | 11/2015 | |
| DE | 102016206954 A1 | * | 10/2017 | ............ F02B 39/005 |
| DE | 102016206955 A1 | * | 10/2017 | ............ H02K 5/20 |
| FR | 2995719 A1 | | 3/2014 | |
| WO | WO-2016000929 A1 | * | 1/2016 | ............ F16J 15/34 |
| WO | WO-2016000930 A1 | * | 1/2016 | ............ F16J 15/34 |
| WO | WO-2016000932 A1 | * | 1/2016 | ............ F16J 15/34 |

OTHER PUBLICATIONS

English abstract for DE-102012100054.
English abstract for DE-102016206954.
English abstract for DE-202004012820.

* cited by examiner

EXHAUST GAS TURBOCHARGER COMPRISING ADJUSTING DEVICE

CROSS-REFERENCE TO RELATED APPLICATIONS

This application claims priority to German Patent Application No. DE 10 2017 200 771.0, filed on Jan. 18, 2017, the contents of which are hereby incorporated by reference in its entirety.

TECHNICAL FIELD

The invention at hand relates to an adjusting device for mechanically actuating a component, such as, for example, a waste-gate valve or a variable turbine geometry of an exhaust gas turbocharger. In addition, the invention relates to an exhaust gas turbocharger, which is equipped with such an adjusting device.

BACKGROUND

Such an adjusting device can be equipped with an electric motor, by means of which an actuator of the adjusting device can be driven so as to rotate. The adjusting device can be mechanically connected to the respective component, which is to be actuated, via the actuator. If the adjusting device is used in an environment with a high temperature, such as, for example, at an internal combustion engine, in particular on an exhaust gas turbocharger, the adjusting device can be connected to a cooling circuit. At the same time, heat can thereby also be discharged from the electric motor. A housing of the adjusting device can accordingly be equipped with an electrical connection for electrically supplying and controlling the electric motor on the one hand, and with fluidic connections for supplying and discharging a coolant on the other hand.

To be able to fasten the adjusting device to a periphery, such as, for example, to an exhaust gas turbocharger, the housing can be equipped with a plurality of fastening points, which make it possible, for example, to screw the housing to said periphery. For this purpose, these fastening points have a predetermined relative position to one another, which depends on the respective periphery, to which the housing is to be fastened.

On principle, such an adjusting device can be used in the case of different motor types and different turbocharger types. However, it turned out that very different installation situations are thereby often at hand, so that for example the position of the coolant connections on the one hand and the position of the electrical connection on the other hand, do not match the relative position on the periphery, which is predetermined by the positions of the fastening points. A cumbersome cable routing is then frequently required. In the alternative, different alternatives of the adjusting device can be used, which, however, is particularly expensive.

An electromagnetic valve, which has a housing, in which a solenoid for linearly actuating a valve member is arranged, is known from DE 10 2013 220 740 A1. An electrical connection for electrically supplying and controlling the solenoid is also located on the housing. A flange, which has a plurality of fastening points, by means of which the valve can be fastened to a periphery, is attached to the outside of the housing. The flange can be fixed in different rotational positions relative to the housing, whereby it is possible to fix the valve to the periphery with different spatial orientations of the electrical connection.

SUMMARY

The invention at hand deals with the problem of specifying an improved embodiment for an adjusting device of the above-described type or for an exhaust gas turbocharger, which is equipped therewith respectively, which is in particular characterized in that an increased variability for different installation situations is available.

According to the invention, this problem is solved by the subject matter of the independent claim(s). Advantageous embodiments are the subject matter of the dependent claims.

The invention is based on the general idea of embodying the housing at least in two parts such that a first housing part and a second housing part abut on one another in a dividing plane. The first housing part has an inlet connection for supplying a coolant and an outlet connection for discharging the coolant. The second housing part has an electrical connection for electrically supplying and controlling the electric motor. In addition, the actuator is located on the second housing part. The first housing part is further equipped with first fastening elements, while the second housing part is equipped with second fastening elements. Via these fastening elements, it is possible, on principle, to fix the two housing parts to one another. These fastening elements are now adapted to one another in such a way that the two housing parts can be fastened to one another in different rotational positions. Due to the fact that the fluid connections on the one hand and the electrical connection on the other hand are located at different housing parts, different relative positions between the fluid connections and the electrical connection can be adjusted thereby. The housing of the adjusting device can thus be easily adapted to different installation situations, so that the same adjusting device can be used in the case of different installation situations.

Advantageously, the electric motor is provided to rotationally drive the actuator, which serves for coupling to the respective component. Advantageously, the electric motor can have a stator and a rotor comprising rotor shaft and which can be rotated about an axis of rotation. Optionally, the first housing part can include a motor mounting, into which the electric motor is axially inserted in such a way that the axis of rotation runs perpendicular to the dividing plane and that the rotor shaft protrudes into the second housing part. Due to the fact that the actuator is arranged on the second housing part, the mechanical coupling between rotor shaft and actuator occurs in the second housing part. This mechanical coupling can occur directly. However, the mechanical coupling preferably occurs indirectly via a gear.

The first housing part can optionally comprise a cooling channel, which surrounds the motor mounting in the circumferential direction over at least 180 degrees.

To be able to fix the two housing parts to one another in different rotational positions, provision is advantageously made for the first fastening elements and the second fastening elements to each have the same distance to the axis of rotation of the electric motor and to be arranged so as to be distributed evenly in the circumferential direction. In other words, the first and second fastening elements are located on the same pitch circle. The first fastening elements further have the same angular pitch relative to one another. The second fastening elements also have the same angular pitch relative to one another. As a result, the first housing part and the second housing part can be fastened to one another in a plurality of different rotational positions relative to the axis of rotation.

In the context at hand, the directional information "axial", "radial" and "circumferential direction" refers to the axis of rotation of the electric motor. The axis of rotation defines the axial direction, so that the axial direction runs parallel to the axis of rotation. The radial direction runs at right angles to the axial direction. The circumferential direction runs around the axis of rotation.

An advantageous embodiment proposes for a first number of first fastening elements on the first housing part to be equal to a second number of second fastening elements on the second housing part. A comparatively inexpensive construction is realized thereby.

As an alternative, a first number of first fastening elements on the first housing part can be an integral multiple of a second number of second fastening elements on the second housing part. As an alternative, a second number of second fastening elements on the second housing part can be an integral multiple of a first number of first fastening elements on the first housing part. For example, three first fastening elements and six second fastening elements can be provided or vice versa. Overall, six different relative positions can then be realized, in the case of which only three first and second fastening elements cooperate in each case. This results in a higher flexibility with regard to the adaptation to different installation situations.

An embodiment, in the case of which a pair of first fastening element and second fastening element forms a fastening point, via which the housing can be fastened to a periphery of the adjusting device, is advantageous. If the housing is fastened to the periphery via the respective fastening point, a fastening of the first housing part to the second housing part thereby also occurs simultaneously. If the same number of first fastening elements and second fastening elements is provided, all first fastening elements in each case advantageously form such a fastening point with the corresponding second fastening elements. If different numbers are provided for the first fastening elements and the second fastening elements, all of the first and second fastening elements, which cooperate with one another in the respective relative position, in each case advantageously form such a fastening point.

In the case of another embodiment, the first fastening elements can in each case have an axial first through opening, while the second fastening elements in each case have an axial second through opening. In the case of the cooperating first and second fastening elements, the corresponding first through opening and the corresponding second through opening are axially aligned with one another in the respective relative position. As a result, a bolt or the like can be axially pushed through such a pair of first and second through opening, with the help of which the two housing parts can be fixed to one another and/or with the help of which the housing can be fixed to the periphery of the adjusting device.

In the case of an advantageous further development, the first through openings and/or the second through openings can be embodied as elongated holes, which extend in a curved manner in the circumferential direction. In other words, the respective elongated hole has a circular arc segment-shaped cross section. The respective elongated hole defines an angular range, in which quasi any rotational position between first and second housing part can be adjusted. The adaptability of the adjusting device to varying installation situations is improved thereby.

On principle, the front sides of first housing and part and second housing part, which face one another, can be embodied so as to be flat, so that, in connection with the elongated holes, quasi any rotational positions can be adjusted. It is likewise conceivable to provide a type of axial toothing, in particular on the front sides, in order to provide grid dimensions for angular increments, in which the rotational positions of the two housing parts can be adjusted gradually relative to one another.

Another embodiment provides for a catch hook, which locks with a catch profile embodied on the other of first and second fastening element and thus axially fixes the first housing part to the second housing part, is embodied on the one of first and second fastening element.

By locking the two housing parts to one another, the handling of the adjusting device prior to its assembly to the respective periphery is facilitated. In particular, this locking can serve as pre-fixing for assembly purposes. In the installed state, thus when the housing is fixed to the periphery, a final fixation of the housing parts to one another occurs simultaneously via the fastening elements or via the fastening points, respectively. The locking is then no longer required. Provision can in particular be made for the locking to be quasi without effect in response to the final fixation of the housing parts to one another. For this purpose, provision can be made, for example, for the respective catch hook to no longer engage or be in contact with the corresponding catch profile, respectively, in the finally fixed state of the two housing parts.

An advantageous further development proposes that only the one of first and second through opening is embodied as elongated hole and that the one fastening element, the through opening of which is embodied as elongated hole, has a plurality of catch profiles, which are distributed in the circumferential direction, in particular evenly, while the other fastening element only has one catch hook, which can in each case be locked with one of the catch profiles in a plurality of rotational positions between first housing part and second housing part. If, for example, only the first through opening is embodied as elongated hole, the first fastening element has a plurality of catch profiles, while the second fastening element has exactly one catch hook.

Another embodiment proposes that a gear, via which the rotor shaft is connected to the actuator, be arranged in the second housing part. Provision is further more for the actuator to be capable of being pivoted about a pivot axis, which runs parallel to the axis of rotation and has a distance thereto. In other words, the pivot axis of the actuator is positioned eccentrically to the axis of rotation of the electric motor. This construction has the result that the position of the actuator can also be varied by rotating the two housing parts to one another.

Advantageously, the first housing part and the second housing part can be embodied in such a way in the dividing plane that they can be fixed to one another in a plurality of different rotational positions relative to the axis of rotation. Advantageously, the front sides of the two housing parts, which face one another, can thereby be configured in a rotationally symmetrical manner relative to the axis of rotation. Said front sides can in particular be embodied so as to be substantially flat.

For example, the first housing part can have a first annular surface on the dividing plane, while the second housing part has a second annular surface on the dividing plane. A groove, which forms the cooling channel, can be formed in the first annular surface. This groove can thereby extend across at least 180 degrees in the circumferential direction and can connect the inlet connection to the outlet connection. It is likewise conceivable to embody the groove so as to be closed in the circumferential direction, so that the cooling channel extends across 360 degrees in the circumferential direction. To avoid a short-circuit between inlet connection and outlet connection, a flow obstacle can be arranged in the cooling channel in the circumferential direction between inlet connection and outlet connection.

Provision can furthermore be made for at least one sealing groove for accommodating an annular seal, which revolves in the circumferential direction in a closed manner, to be formed in the first annular surface and/or in the second annular surface. Advantageously, provision is made for two such sealing grooves, which are arranged radially on both sides of the cooling channel. The cooling channel can be sealed efficiently thereby.

An exhaust gas turbocharger according to the invention is embodied with a variable turbine geometry and with an adjusting device according to the above-described type, wherein the adjusting device serves to actuate the variable turbine geometry. For this purpose, the actuator of the adjusting device is mechanically connected to an actuating member of the variable turbine geometry. The variable turbine geometry has a plurality of guide vanes, which are arranged along an inflow channel, which leads to a turbine wheel of a turbine of the exhaust gas turbocharger. The variable turbine geometry further comprises a vane adjusting device, with the help of which the guide vanes can be adjusted so as to change their pitch. This vane adjusting device can be actuated mechanically via the actuating member.

Another exhaust gas turbocharger according to the invention is equipped with a waste-gate valve and with an adjusting device of the above-described type, wherein the adjusting device serves to actuate the waste-gate valve. The actuator of the adjusting device is thereby mechanically connected to an actuating member of the waste-gate valve. The waste-gate valve controls a bypass for bypassing a turbine wheel of a turbine of the exhaust gas turbocharger. Advantageously, the actuating member is thereby mechanically connected to a valve member of the waste-gate valve.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the invention at hand.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
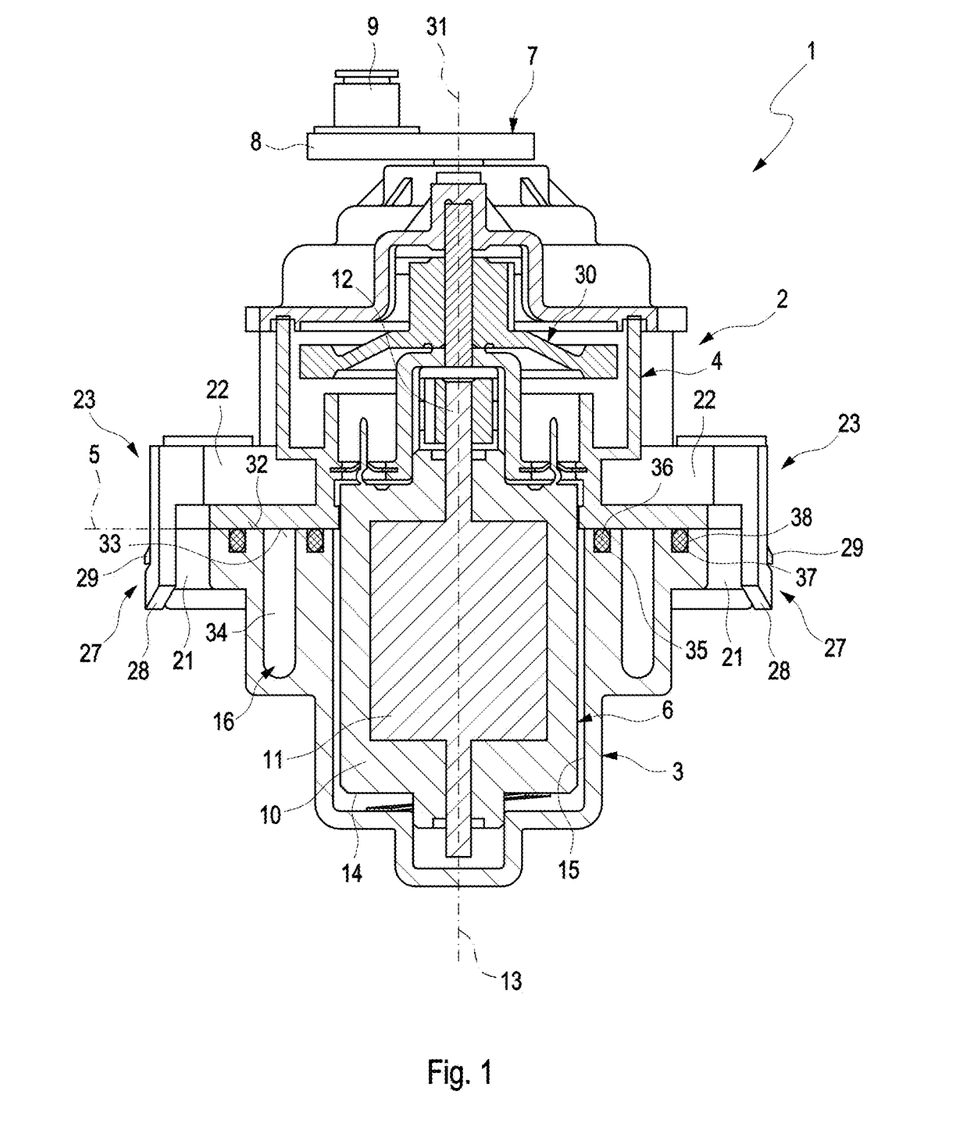
FIG. 1 shows a highly simplified longitudinal section of an adjusting device.

According to FIG. 1, an adjusting device 1, which serves for the mechanical actuation of a component, which is not shown here, comprises a housing 2, which has a first housing part 3 and a second housing part 4, which abut on one another in a dividing plane 5. In addition, the adjusting device 1 is equipped with an electric motor 6 for rotationally driving an actuator 7. The actuator 7, in turn, serves to couple to the respective component, which can be actuated with the help of the adjusting device 1. For this purpose, the actuator 7 can for example have a pivot arm 8, which is equipped with a coupling pin 9 for mechanically coupling to the respective component.

In the usual way, the electric motor 6 has a stator 10 and a rotor 11 comprising a rotor shaft 12, wherein the rotor 11 is supported so as to be capable of being rotated about an axis of rotation 13. For this purpose, provision can be made for corresponding bearings, which are not shown here, for example on a motor housing 14, which supports the stator 10.

Figure 2:
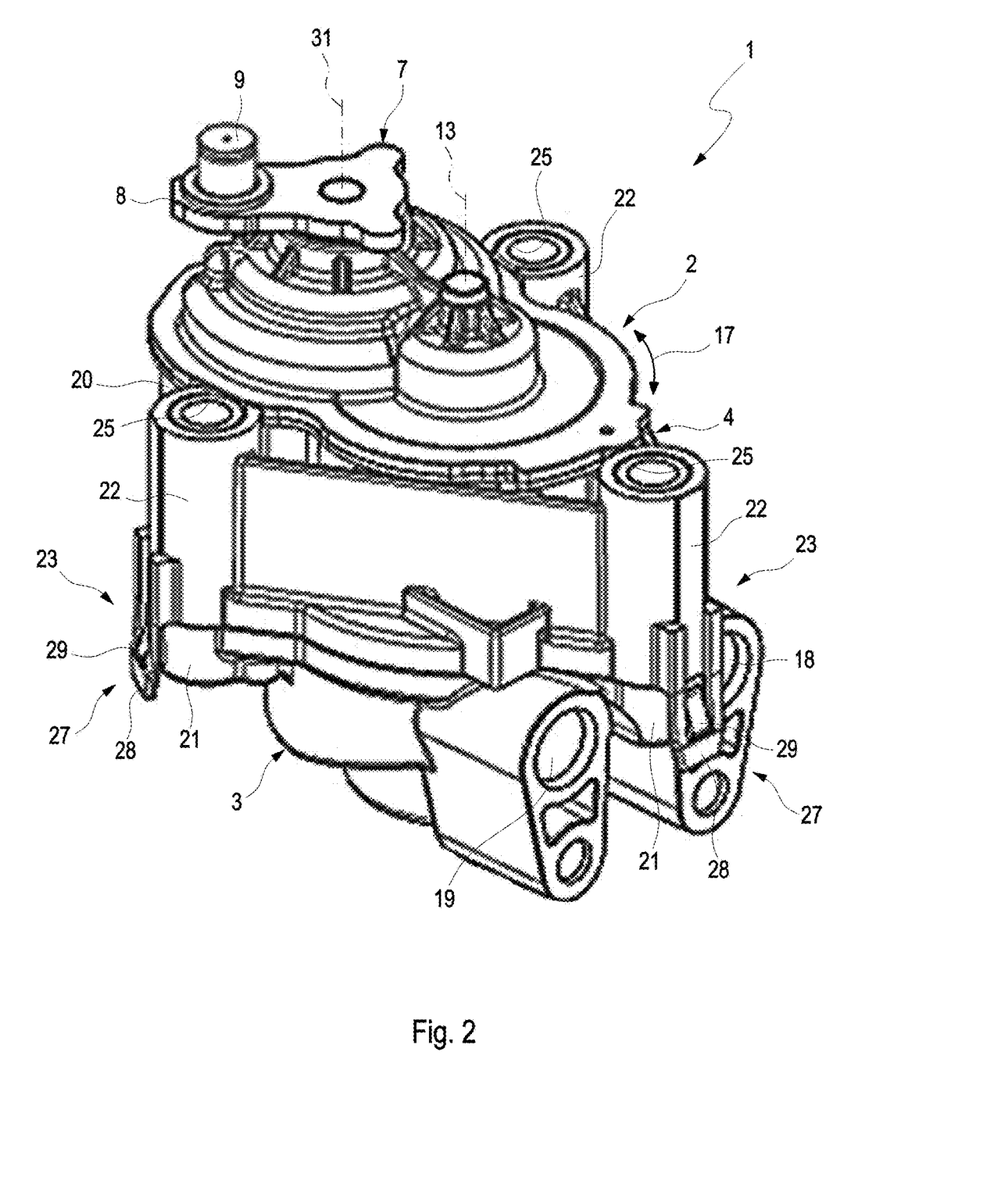
FIG. 2 shows an isometric view of the adjusting device.
Figure 3:
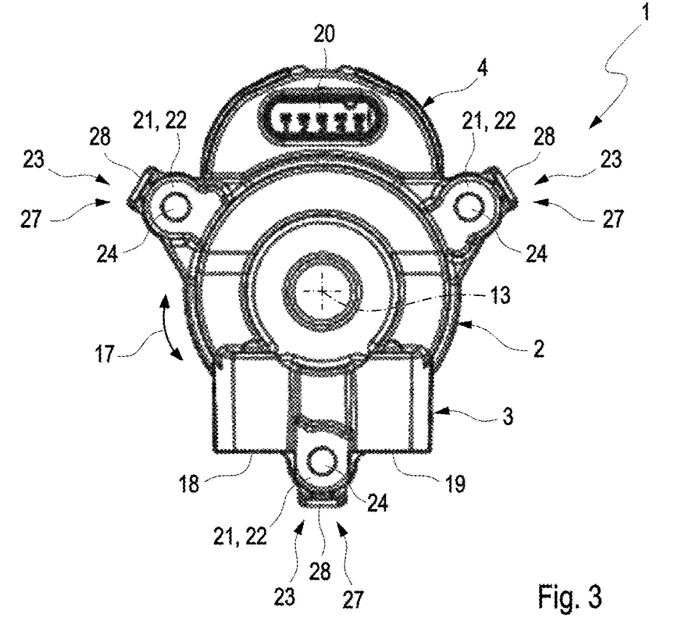
FIGS. 3 to 5 show views from the bottom onto the adjusting device in the case of different configurations.
Figure 4:
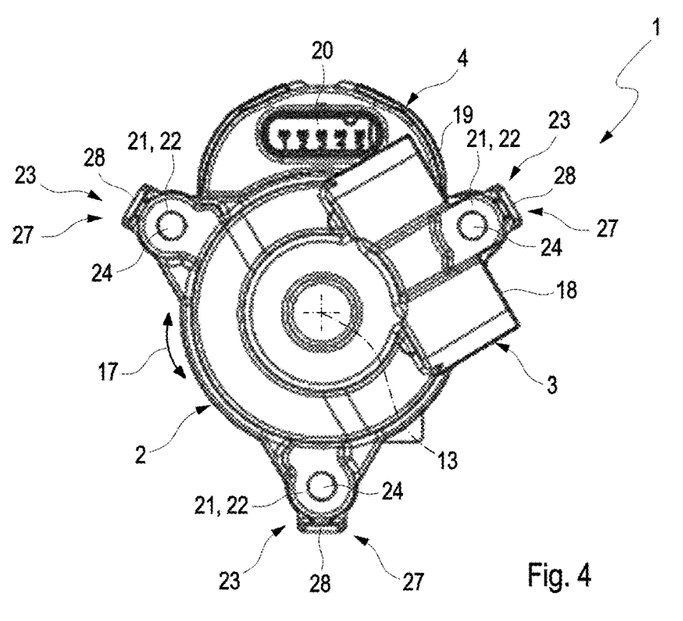
Figure 5:
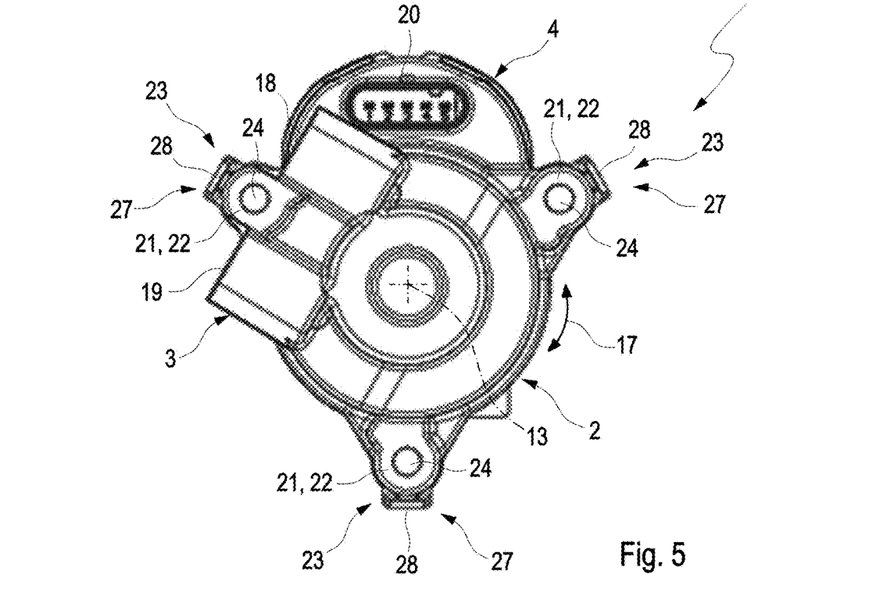

The first housing part 3 includes a motor mounting 15, into which the electric motor 6 is inserted axially. The motor mounting 15 is formed complementary to the motor housing 14 and can in particular have a cylindrical cross section. The electric motor 6 is inserted into the motor mounting 15 in such a way that its axis of rotation 13 runs perpendicular to the dividing plane 5 and in such a way that the rotor shaft 12 protrudes axially into the second housing part 4. In addition, the first housing part 3 has a cooling channel 16, which surrounds the motor mount 15 in the circumferential direction over at least 180 degrees, which is identified by a double arrow and which is identified with 17 in FIGS. 2 to 7. The first housing part 3 according to FIG. 2 further has at least one inlet connection 18 for supplying a coolant to the channel 16 and an outlet connection 19 for discharging the coolant from the channel 16. Typically, the coolant is in liquid form and can consist of water or of a water-antifreeze mixture, respectively.

The second housing 4 has an electrical connection 20, which can be seen in FIGS. 2 to 5, for electrically supplying and controlling the electric motor 6. The actuator 7 is further arranged on the second housing part 4. First fastening elements 21, which can cooperate with second fastening elements 22, which are embodied on the second housing part 4, are further embodied on the first housing part 3. The first fastening elements 21 and the second fastening elements 22 are embodied complementary to one another. On principle, the first housing part 3 and the second housing part 4 can be fastened to one another via the first fastening elements 21 and the second fastening elements 22. As can in particular be gathered from FIGS. 3 to 5, the first fastening elements 21 and the second fastening elements 22 in each case have the same radial distance to the axis of rotation 13, so that they are located on the same pitch circle, and are additionally arranged so as to be distributed evenly in the circumferential direction 17, so that they thus have the same angular pitches to one another. As a result, the first housing part 3 and the second housing part 4 can be fastened to one another in a plurality of different rotational positions relative to the axis of rotation 13. According to FIGS. 3 to 5, three different rotational positions can be adjusted between the two housing parts 3, 4. This can be attributed to the fact that exactly three first fastening elements 21 and exactly three second fastening elements 22 are provided, which are in each case arranged on the respective housing part 3, 4 so as to be offset by 120° relative to one another. In this example, a first number of first fastening elements 21 on the first housing part 3 is thus equal to a second number of second fastening elements 22 on the second housing part 4. Here, the respective number is three (3). In the case of another embodiment, provision can be made in the alternative for the number of the one fastening elements 21 or 22 to be an integral multiple of the number of the other fastening elements 22 or 21. For example, provision can be made for six (6) first fastening elements 21 and three (3) second fastening elements 22. It is likewise conceivable to combine eight (8) or twelve (12) second fastening elements 22 with four (4) first fastening elements 21. Other numerical examples are possible as well.

A pair of first fastening location 21 and second fastening location 22, which cooperate in the respective relative position of the two housing parts 3, 4, form a fastening location 23, via which the housing 2 can be fastened to a periphery of the adjusting device 1, which is not shown here. In the case of a preferred use of the adjusting device 1 on an exhaust gas turbocharger, this periphery is a housing or another part of the exhaust gas turbocharger. By fastening the housing 2 to the periphery, a fixation of the two housing parts 3, 4 to one another can be effected at the same time. This will be described in more detail below.

For example, the first fastening elements 21 can in each case have an axial first through opening 24, through which a pin-shaped fastening element, such as, for example, a screw shank, a threaded pin or a bolt, can be pushed. The second fastening element 22 can in each case also have an axial second through opening 25, through which a pin-shaped fastening element, advantageously the same fastening element, can also be pushed. At the respective fastening location 23, a pin-shaped fastening element can thus be axially pushed through the two through openings 24, 25, which are axially aligned with one another, so as to fix the housing 2 to the periphery. With the help of a screw connection, which is supported on the first housing part 3, the second housing part 4 can for example thereby be braced against the periphery. At the same time, a fixation of the two housing parts 3, 4 to one another is thus attained thereby. For this purpose, for example a screw head or a screw nut can axially come to rest on the first fastening element 21 on an edging, which surrounds the first through opening 24, either directly or via a disk. A screw shank then extends through the first through opening 24 and through the second through opening 25 into the periphery, so that an opening edge, which is formed on the second fastening element 22 and which surrounds the second through opening 25, is axially supported on the periphery, either directly or indirectly via a disk.

Figure 6:
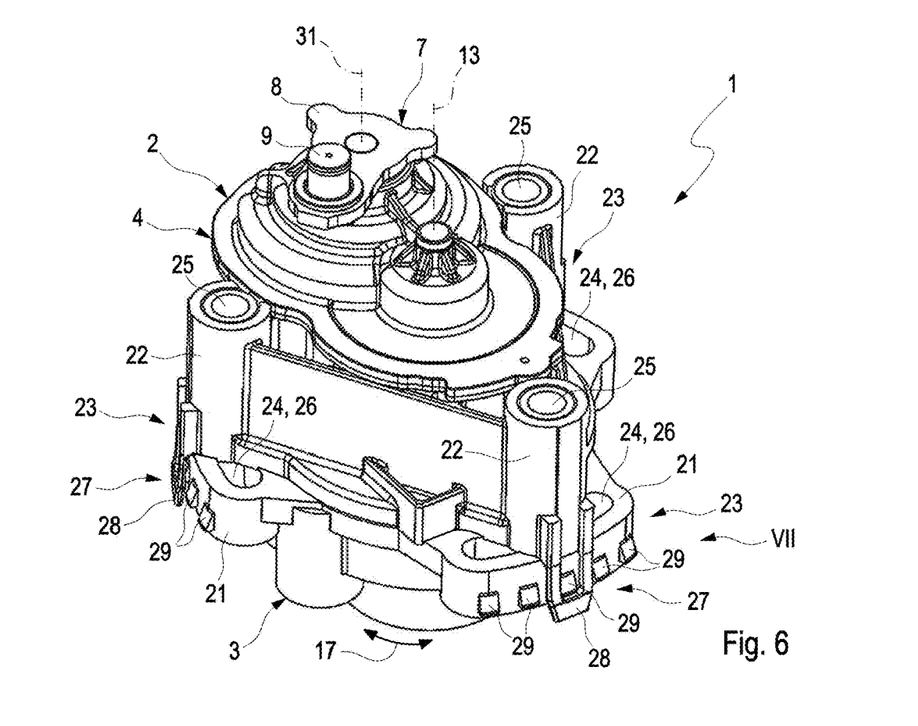
FIG. 6 shows an isometric view of the adjusting device as in FIG. 2, but in the case of a different embodiment.
Figure 7:
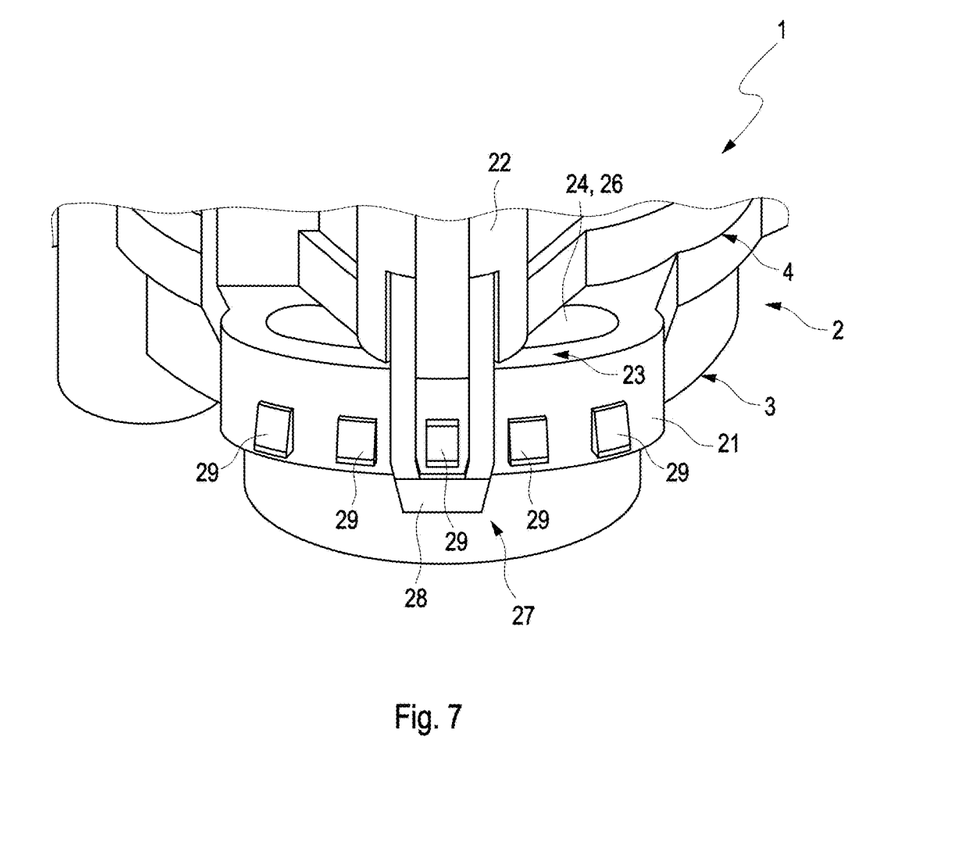
FIG. 7 shows an enlarged view of a detail VII from FIG. 6, FIGS. 8A and 8B show a highly simplified sectional view in the area of a fastening point at different states.

In the examples of FIGS. 1 to 5, the first through openings 24 and the second through openings 25 are in each case embodied as cylindrical or circular through openings, respectively. In contrast thereto, FIGS. 6 and 7 show an example, in the case of which the first through openings 24 are embodied as elongated holes 26. These elongated holes 26 are thereby located on the pitch circle and thus extend in a curved manner in the circumferential direction 17. In their longitudinal direction, the elongated holes 26 thus extend along a circular arc. It is clear that different rotational positions between the two housing parts 3, 4 can now be adjusted and fixed via the circular arc, which is defined with the help of the respective elongated hole 26. This can quasi take place in a continuous manner. A tiered or gradual adjustability in the circumferential direction 17 is likewise conceivable.

In the case of the embodiments shown here, a locking 27, with the help of which it is possible to fix the two housing parts 3, 4 to one another, even if the housing 2 itself is not yet fastened to said periphery, is in each case additionally assigned to the fastening locations 23. This locking 27 simplifies the handling of the adjusting device 1 prior to and during the assembly. On one of the fastening elements 21, 22, the locking 27 has a catch hook 28. In the examples shown here, the respective catch hook 28 is always embodied on the second fastening element 22. The catch hook 28 cooperates with a catch profile 29, which is embodied on the respective other fastening element 21, 22. In the case of the examples shown here, the catch profile 29 is thus in each case located on the first fastening element 21. If a provided relative position is present between the two housing parts 3, 4, the respective catch hook 28 can lock with the respective catch profile 29 and can effect an axial fixation of the two housing parts 3, 4 on one another.

According to FIGS. 6 and 7, provision can now be made for only the respective first fastening element 21 to have a first through opening 24, which is embodied as elongated hole 26, and to have a plurality of catch profiles 29, which are arranged so as to be distributed evenly in the circumferential direction 17. Only a single catch hook 28, which can now lock with one of the catch profiles 29 each in a plurality of different rotational positions between the two housing parts 3 and 4, is then advantageously embodied on the corresponding second fastening element 22. In the shown example, provision is made for exactly five catch profiles 29 on the respective first fastening element 21. Inside the same fastening location 23, the catch hook 28 can thus accordingly lock in five different rotational positions between the two housing parts 3, 4 with one of the catch profiles 29.

According to FIG. 1, a gear 30, which is connected to the actuator 7 via the rotor shaft 12, can be arranged in the second housing part 4. The actuator 7 can thereby be pivoted about a pivot axis 31, which runs parallel to the axis of rotation 13. The pivot axis 31 is thereby radially spaced apart from the axis of rotation 13, which can be seen in FIG. 6. In FIG. 1, the axis of rotation 13 and the pivot axis 31 are located behind one another in the viewing direction, so that they presumably coincide.

So as to be able to realize the rotatability of the two housing parts 3, 4 introduced here in accordance with the distribution of the individual fastening elements 21, 22, the two housing parts 3, 4 are designed accordingly in the dividing plane 5. Provision can in particular be made according to FIG. 1 for the first housing part 3 to have a first annular surface 32 on the dividing plane 5, while the second housing part 4 has a second annular surface 33 on the dividing plane 5. In the example of FIG. 1, the second annular surface 33 is embodied as flat annular disk. In contrast, a groove 34, which forms the cooling channel 16, is formed in the first annular surface 32. As does the channel 16, the groove 34 thereby extends in the circumferential direction 17 over at least 180 degrees. An inner sealing groove 35 for accommodating an inner sealing ring 36 and an outer sealing groove 37 for accommodating an outer sealing ring 38 are further formed in the first annular surface 32. The sealing rings 36, 38 in each case revolve in a closed manner in the circumferential direction 17 and serve as axial seal, because they axially abut on the flat second annular surface 33. The second annular surface 33 closes the axially open side of the groove 34 and thus of the channel 16.

Figure 8:
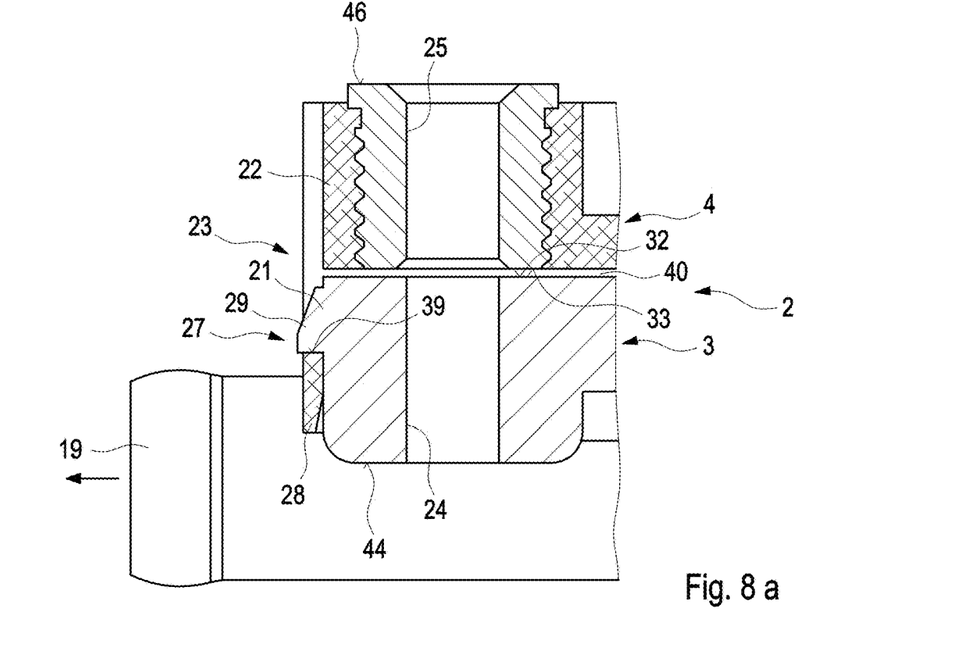

With reference to FIGS. 8a and 8b, a particular embodiment of the fastening locations 23 will also be described below in combination with the lock 27. A preassembly state is reproduced in FIG. 8a, in the case of which the first housing part 3 is fixed to the second housing part 4 via the lock 27 in the area of the respective fastening location 23. This can be seen in that the catch hook 28 is engaged and in contact with the catch profile 29 in a positive manner. The positive engagement is identified with 39 in FIG. 8a. An axial gap 40 can further be seen axially between the first fastening element 21 and the second fastening element 22, so that in particular the first annular surface 32 does not abut on the second annular surface 33. This can in particular be attributed to the axial pretensioning force of the sealing rings 36, 38. In this preassembly state, the housing 2 is not fastened to the respective periphery, which is suggested with a broken line and identified with 41 in FIG. 1.

FIG. 8b now shows a final assembly state, in which the housing 2 is fastened to the periphery 41. For this purpose, a screw 42, which is suggested with a broken line in FIG. 8b, for example, can penetrate the fastening elements 21, 22 in the through openings 24, 25 thereof at the respective fastening location 23. The screw 42 can be axially supported by means of a screw head 43 on a front side 44 of the first fastening element 21, which faces away from the second fastening element 22, and can be screwed to the periphery 41 through the through openings 24, 25 by means of its screw shaft 45. An axial front side 46 of the second fastening element 42, which faces away from the first fastening element 21, can thereby be axially supported on the periphery 41. As soon as the screw 42 has been tightened, the first annular surface 32 and the second annular surface 33 abut axially on one another, so that the axial gap 40 disappears. At the same time, the engagement 39 between catch hook 28 and catch profile 29 is eliminated, which can be seen in FIG. 8b by means of a gap 47, which is now formed axially between the catch hook 28 and the catch profile 29. In other words, catch hook 28 and catch profile 29 are no longer in contact and are also no longer engaged in this respect. The fixation of the two housing parts 3, 4 on one another now occurs via the fixation of the housing 2 on the periphery 41, thus in particular via the respective screw 42. Instead of the screw head 43, provision can also be made for a screw nut.

The invention claimed is:

1. An adjusting device for mechanically actuating a component, comprising:
    a housing including a first housing part and a second housing part that abut on one another along a dividing planes;
    an electric motor for rotationally driving an actuator, the actuator arranged on the second housing part and configured to couple to a component;
    the electric motor including a stator and a rotor, the rotor including a rotor shaft rotatable about an axis of rotation;
    the first housing part including a motor mounting structured and arranged to receive the electric motor axially with respect to the axis of rotation of the rotor shaft, wherein the axis of rotation extends perpendicular to the dividing plane such that the rotor shaft protrudes into the second housing part;
    the first housing part further including a cooling channel that surrounds the motor mounting in a circumferential direction over at least 180 degrees;
    the first housing part further includes an inlet connection for supplying a coolant and an outlet connection for discharging the coolant;
    the second housing part including an electrical connection configured to supply electricity to and control the electric motor;
    wherein the first housing part and the second housing part are fastenable to one another via a plurality of first fastening elements disposed on the first housing part and a plurality of second fastening elements provided complementary thereto and disposed on the second housing part;
    wherein a distance between the plurality of first fastening elements and the axis of rotation is the same as a distance between the plurality of second fastening elements and the axis of rotation; and
    wherein the plurality of first fastening elements and the plurality of second fastening elements are arranged evenly distributed in the circumferential direction such that the first housing part and the second housing part are fastenable to one another in a plurality of different rotational positions relative to the axis of rotation.

2. The adjusting device according to claim 1, wherein a first number of the plurality of first fastening elements on the first housing part is equal to a second number of the plurality of second fastening elements on the second housing part.

3. The adjusting device according to claim 1, wherein at least one of:
    a first number of the plurality of first fastening elements on the first housing part is an integral multiple of a second number of the plurality of second fastening elements on the second housing part; and
    the second number of the plurality of second fastening elements on the second housing part is an integral multiple of the first number of the plurality of first fastening elements on the first housing part.

4. The adjusting device according to claim 1, wherein one of the plurality of first fastening elements and a corresponding one of the plurality of second fastening elements provide a fastening point, and the housing is fastenable via the fastening point to a periphery.

5. The adjusting device according to claim 1, wherein:
    the plurality of first fastening elements each include an axial first through opening; and
    the plurality of second fastening elements each include an axial second through opening.

6. The adjusting device according to claim 5, wherein at least one of (i) the first through openings and (ii) the second through opening is an elongated holes extending in a curved manner in the circumferential direction.

7. The adjusting device according to claim 1, further comprising a catch hook configured to engage a catch profile, wherein one of the plurality of first fastening elements and the plurality second fastening elements includes the catch hook, and the other of the plurality of first fastening elements and the plurality of second fastening elements includes the catch profile to axially fix the first housing part and the second housing part together when engaged.

8. The adjusting device according to claim 6, wherein:
    only one of the first through opening and the second through opening has the elongated hole;
    a corresponding one of the plurality of first fastening elements and the plurality of second fastening elements having the elongated hole further includes a plurality of catch profiles distributed in the circumferential direction; and
    the other of the plurality of first fastening elements and the plurality of second fastening elements includes one catch hook configured to engage the plurality of catch profiles in a plurality of rotational positions between the first housing part and the second housing part.

9. The adjusting device according to claim 1, further comprising a gear arranged in the second housing part and connecting the rotor shaft to the actuator, wherein the actuator is pivotable about a pivot axis extending parallel to the axis of rotation and disposed a distance therefrom.

10. The adjusting device according to claim 1, wherein the first housing part and the second housing part are structured along the dividing plane to provide a fixed connection in the plurality of different rotational positions relative to the axis of rotation.

11. The adjusting device according to claim 1, wherein the first housing part has a first annular surface on the dividing plane, and the second housing part has a second annular surface on the dividing plane.

12. The adjusting device according to claim 11, further comprising a groove disposed on the first annular surface, the groove defining at least part of the cooling channel.

13. The adjusting device according to claim 11, further comprising at least one sealing groove configured to accommodate an annular seal, the at least one sealing groove extending in the circumferential direction in a closed manner and disposed in at least one of the first annular surface and the second annular surface.

14. An exhaust gas turbocharger, comprising:
a variable turbine geometry; and
an adjusting device for actuating the variable turbine geometry, the adjusting device including:
  a housing including a first housing part and a second housing part that abut one another along a dividing plane, the first housing part including a motor mounting and a cooling channel, the cooling channel surrounding the motor mounting in a circumferential direction over at least 180 degrees, the first housing part further including an inlet connection for supplying a coolant and an outlet connection for discharging the coolant;
  an electric motor for rotationally driving an actuator, the actuator arranged on the second housing part, the electric motor including a stator and a rotor, the rotor including a rotor shaft rotatable about an axis of rotation, the electric motor arranged axially with respect to the axis of rotation within the motor mounting such that the axis of rotation extends perpendicular to the dividing plane and the rotor shaft protrudes into the second housing part; and
  the second housing part including an electrical connection configured to supply electricity to and control the electric motor;
  wherein the first housing part and the second housing part are fastenable to one another via a plurality of first fastening elements disposed on the first housing part and a plurality of second fastening elements provided complementary thereto and disposed on the second housing part;
  wherein a distance between the plurality of first fastening elements and the axis of rotation is the same as a distance between the plurality of second fastening elements and the axis of rotation; and
  wherein the plurality of first fastening elements and the plurality of second fastening elements are arranged evenly distributed in the circumferential direction such that the first housing part and the second housing part are fastenable to one another in a plurality of different rotational positions relative to the axis of rotation;
wherein the actuator of the adjusting device is mechanically connected to a second actuator of the variable turbine geometry.

15. An exhaust gas turbocharger, comprising:
a waste-gate valve; and
an adjusting device for actuating the waste-gate valve, the adjusting device including:
  a housing including a first housing part and a second housing part that abut one another along a dividing plane, the first housing part including a motor mounting and a cooling channel, the cooling channel surrounding the motor mounting in a circumferential direction over at least 180 degrees, the first housing part further including an inlet connection for supplying a coolant and an outlet connection for discharging the coolant;
  an electric motor for rotationally driving an actuator, the actuator arranged on the second housing part, the electric motor including a stator and a rotor, the rotor including a rotor shaft rotatable about an axis of rotation, the electric motor arranged axially with respect to the axis of rotation within the motor mounting such that the axis of rotation extends perpendicular to the dividing plane and the rotor shaft protrudes into the second housing part; and
  the second housing part including an electrical connection configured to supply electricity to and control the electric motor;
  wherein the first housing part and the second housing part are fastenable to one another via a plurality of first fastening elements disposed on the first housing part and a plurality of second fastening elements provided complementary thereto and disposed on the second housing part;
  wherein a distance between the plurality of first fastening elements and the axis of rotation is the same as a distance between the plurality of second fastening elements and the axis of rotation; and
  wherein the plurality of first fastening elements and the plurality of second fastening elements are arranged evenly distributed in the circumferential direction such that the first housing part and the second housing part are fastenable to one another in a plurality of different rotational positions relative to the axis of rotation;
wherein the actuator of the adjusting device is mechanically connected to a second actuating of the waste-gate valve.

16. The adjusting device according to claim 14, wherein:
the plurality of first fastening elements each include an axial first through opening; and
the plurality of second fastening elements each include an axial second through opening.

17. The adjusting device according to claim 16, wherein at least one of (i) the first through opening and (ii) the second through opening is an elongated hole extending in a curved manner in the circumferential direction.

18. The adjusting device according to claim 14, further comprising a catch hook configured to engage a catch profile, wherein one of the plurality of first fastening elements and the plurality of second fastening elements includes the catch hook, and the other of the plurality of first fastening elements and the plurality of second fastening elements includes the catch profile to axially fix the first housing part and the second housing part together when engaged.

19. The adjusting device according to claim 15, wherein:
the plurality of first fastening elements each include an axial first through opening; and
the plurality of second fastening elements each include an axial second through opening.

20. The adjusting device according to claim 15, further comprising a catch hook configured to engage a catch profile, wherein one of the plurality of first fastening elements and the plurality of second fastening elements includes the catch hook, and the other of the plurality of first fastening elements and the plurality of second fastening elements includes the catch profile to axially fix the first housing part and the second housing part together when engaged.

* * * * *

UNITED STATES PATENT AND TRADEMARK OFFICE
CERTIFICATE OF CORRECTION

PATENT NO. : 10,502,124 B2
APPLICATION NO. : 15/873503
DATED : December 10, 2019
INVENTOR(S) : Makarow et al.

Page 1 of 1

It is certified that error appears in the above-identified patent and that said Letters Patent is hereby corrected as shown below:

In the Claims

At Column 9, Claim number 1, Line number 43, please change "planes" to "plane".

At Column 10, Claim number 6, Line number 39, please change "openings" to "opening".

At Column 10, Claim number 6, Line number 40, please change "holes" to "hole".

Signed and Sealed this
Twenty-first Day of July, 2020

Andrei Iancu
*Director of the United States Patent and Trademark Office*